(12) United States Patent
Mazza

(10) Patent No.: US 7,207,509 B2
(45) Date of Patent: Apr. 24, 2007

(54) ELECTRIC CHEESE PROCESSOR

(76) Inventor: Frank Mazza, Suite 4, 4897 Barclay Avenue, Montreal Quebec (CA) H3W 1E1

( * ) Notice: Subject to any disclaimer, the term of this patent is extended or adjusted under 35 U.S.C. 154(b) by 232 days.

(21) Appl. No.: 11/075,061

(22) PCT Filed: Sep. 2, 2003

(86) PCT No.: PCT/CA03/01297

§ 371 (c)(1),
(2), (4) Date: Mar. 3, 2005

(87) PCT Pub. No.: WO2004/021847

PCT Pub. Date: Mar. 18, 2004

(65) Prior Publication Data

US 2005/0263629 A1    Dec. 1, 2005

(30) Foreign Application Priority Data

Sep. 4, 2002    (CA) .................................. 2401469

(51) Int. Cl.
A47J 43/25    (2006.01)
(52) U.S. Cl. ................... 241/65; 241/169.1; 241/273.3
(58) Field of Classification Search ..... 241/168–169.2, 241/65, 273.3, 273.1, 93
See application file for complete search history.

(56) References Cited

U.S. PATENT DOCUMENTS

| | | | |
|---|---|---|---|
| 1,106,931 A | 8/1914 | Donisi | |
| 1,414,657 A | 5/1922 | Mertz et al. | |
| 1,433,554 A | 10/1922 | Kiekutis | |
| 2,208,335 A | 7/1940 | Kurtz | |
| 2,214,075 A | 9/1940 | Crawford | |
| 2,665,724 A | 1/1954 | Lundell | |
| 2,713,474 A | 7/1955 | Read | |
| 2,990,864 A | 7/1961 | Zweben | |
| 3,065,779 A | 11/1962 | Matarrese | |
| 3,606,178 A | 9/1971 | Klopp | |
| 3,897,909 A | 8/1975 | Morley | |
| 4,390,133 A | 6/1983 | Wanat | |
| 5,364,037 A | 11/1994 | Bigelow | |
| 5,435,237 A | 7/1995 | Huang | |
| 5,680,997 A | 10/1997 | Hedrington | |

*Primary Examiner*—Mark Rosenbaum
(74) *Attorney, Agent, or Firm*—Ogilvy Renault LLP; Wayne H. Yan

(57) ABSTRACT

A hand-held electric cheese grinder includes a body having a cheese grinder cylinder rotatably mounted within a chamber of the body and driven by a motor through a transmission mechanism the motor and transmission mechanism are operatively mounted inside the grinding cylinder so that a relative spatial room is provided above the grinder cylinder in the chamber to contain a cheese block to be ground. The cheese block is pressed down against the grinder cylinder by a plunger extending from a cover mounted to the top of the body. A base is preferably provided to support the body when not in operation. The base includes a changer for recharging batteries in the body and a cooling device to maintain a relatively low temperature in the chamber of the body.

19 Claims, 4 Drawing Sheets

ELECTRIC CHEESE PROCESSOR

TECHNICAL FIELD

The present invention relates to a cheese processor, particularly to a hand-held electric cheese processor.

BACKGROUND OF THE INVENTION

Cheese processors are well known in the art as cheese graters or cheese grinders, and generally include a body having a work compartment with a cheese grating or grinding cylinder rotatably mounted therein. The cheese grating or grinding cylinder includes a plurality of teeth or sharp-edged holes to grate or grind the cheese into particles when a cheese block is pressed against the grating or grinding cylinder. A spring biased pusher is attached or incorporated into a door of the work compartment so that the cheese block placed within the work compartment is pushed against the grating or grinding cylinder when the compartment door is closed. The cheese grating or grinding cylinder is rotated either manually or electrically by a motor. Such cheese processors are described, for example in U.S. Pat. No. 1,106,931, issued to Donisi on Aug. 11, 1914 and in U.S. Pat. No. 5,364,037, issued to Bigelow on Nov. 15, 1994.

In these existing cheese processors the load force to the cheese block against the grating or grinding cylinder is gradually reduced when the cheese block is being ground because of the decrease in the volume of the cheese block. Therefore the existing cheese processors can work properly only when the cheese block contained therein is relatively large.

Another problem of the existing cheese processors particularly relating to the hand-held electric types, lies in that the body generally contains not only the grating or grinding cylinder but also a power unit including a motor/transmission mechanism and batteries, and therefore the work compartment for containing the cheese block is relatively limited. Thus the existing cheese processors need frequent reloading of fresh cheese blocks to replace previously loaded and partially consumed cheese blocks, which is not desirable, particularly when the cheese processor is placed on tables for restaurant customers.

It is also desirable to maintain a relatively low temperature in the work compartment of a cheese grater or grinder in order to keep the loaded cheese block fresh. Various food processors with refrigeration features are well known in the art as are described, for example, in U.S. Pat. No. 2,665,724, issued to Lundell on Jan. 12, 1954, U.S. Pat. No. 2,990,864, issued to Zweben on Jul. 4, 1961, U.S. Pat. No. 3,065,779, issued to Matarrese on Nov. 27, 1962. However, the structures of the refrigeration features of such prior art food processors cannot be incorporated into a hand-held electric cheese grater or grinder in a relatively compact configuration.

Therefore, there is a need for an improved cheese processor which overcomes the drawbacks of the existing cheese graters or grinders.

SUMMARY OF THE INVENTION

One object of the present invention is to provide an electric cheese processor having a compact configuration which is convenient for hand-held operation.

It is another object of the present invention to provide an electric cheese processor which maintains a relatively cool temperature therein to keep a loaded cheese block fresh.

In accordance with one aspect of the present invention an electric cheese processor comprises a body having a longitudinal axis extending between a top end and a bottom end thereof and a cover detachably mounted to the top end of the body. The body defines a chamber therein which has top and bottom openings in the respective top end and bottom end. The body houses an electric motor and a processing cylinder. The processing cylinder is positioned substantially perpendicular to the longitudinal axis within the chamber close to the bottom opening and is adapted for rotation when driven by the electric motor. The cover closes the top opening of the chamber and includes a pressing mechanism extendable under an external force into the chamber of the body towards the processing cylinder so that a cheese block contained in an upper section of the chamber is pressed down against the processing cylinder, thereby being processed by the rotating processing cylinder into particles which fall from the bottom opening. The processing cylinder is hollow and the electric motor is mounted therein. Preferably a multilevel planetary gear assembly is provided within the hollow processing cylinder which operatively interconnects the electric motor and the processing cylinder.

In accordance with another aspect of the present invention, an electric cheese processor comprises a body having a longitudinal axis extending between a top end and a bottom end thereof and a cover detachably mounted to the top end of the body. The body defines a chamber therein which has top and bottom openings in the respective top end and bottom end. The body houses an electric motor and a processing cylinder. The processing cylinder is positioned substantially perpendicular to the longitudinal axis within the chamber close to the bottom opening and is adapted for rotation when driven by the electric motor. The cover includes a pressing mechanism extendable under an external force into the chamber towards the processing cylinder so that a cheese block contained in the upper section of the chamber is pressed down against the processing cylinder, thereby being processed by the rotating processing cylinder into particles which fall from the bottom opening. The base includes a cooling device, preferably a thermal-electric element. The body is detachably supported on the base so that the cooling device maintains a relatively low temperature in the chamber of the body.

The electric cheese processor of the present invention advantageously provides a compact configuration applicable to a hand-held operation. A relatively sizable cheese block can be loaded within the chamber of the cheese processor for services over a relatively long period of time, and can remain fresh at a relatively low temperature.

Other advantages and features of the present invention will be better understood with reference to a preferred embodiment described hereinafter.

BRIEF DESCRIPTION OF THE DRAWINGS

Having thus generally described the nature of the present invention, reference will now be made to the accompanying drawings, showing by way of illustration the preferred embodiment thereof, in which.

DETAILED DESCRIPTION OF THE PREFERRED EMBODIMENT

Figure 1:
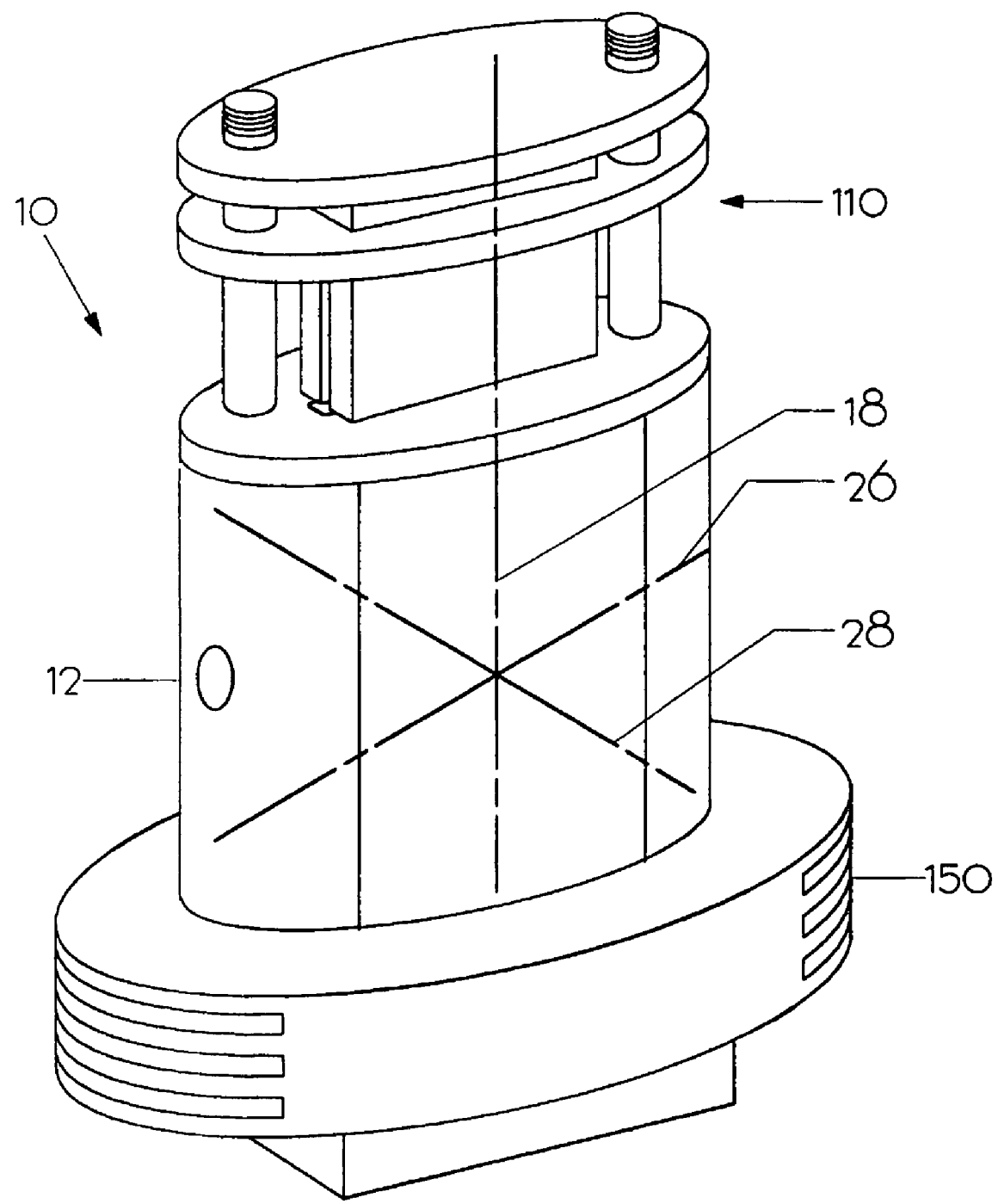
FIG. 1 is a perspective view of a preferred embodiment of the present invention.
Figure 2:
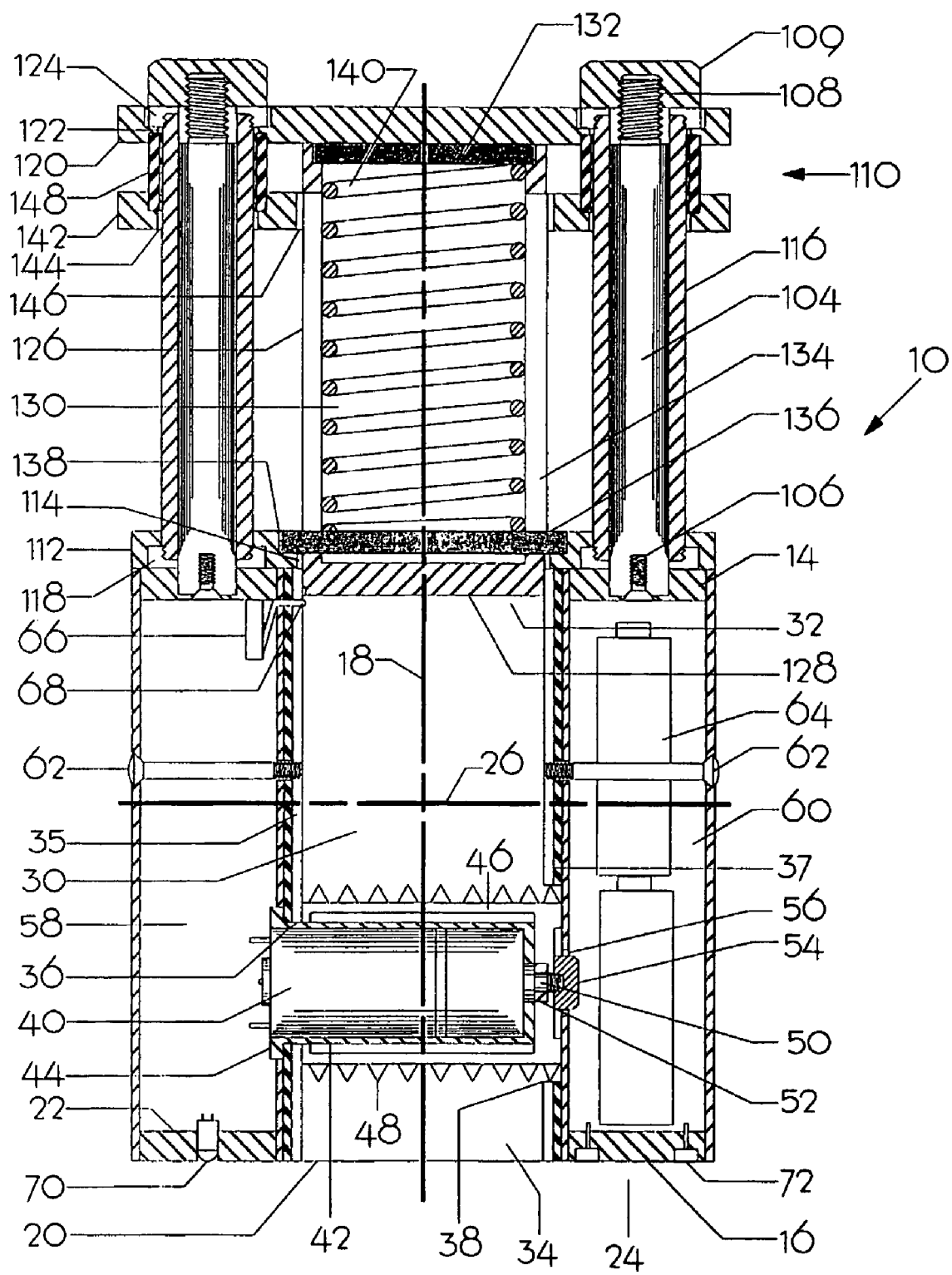
FIG. 2 is a schematic view showing a longitudinal cross-section of the embodiment of FIG. 1, without a base thereof, the schematic view being not proportional to FIG. 1.
Figure 3:
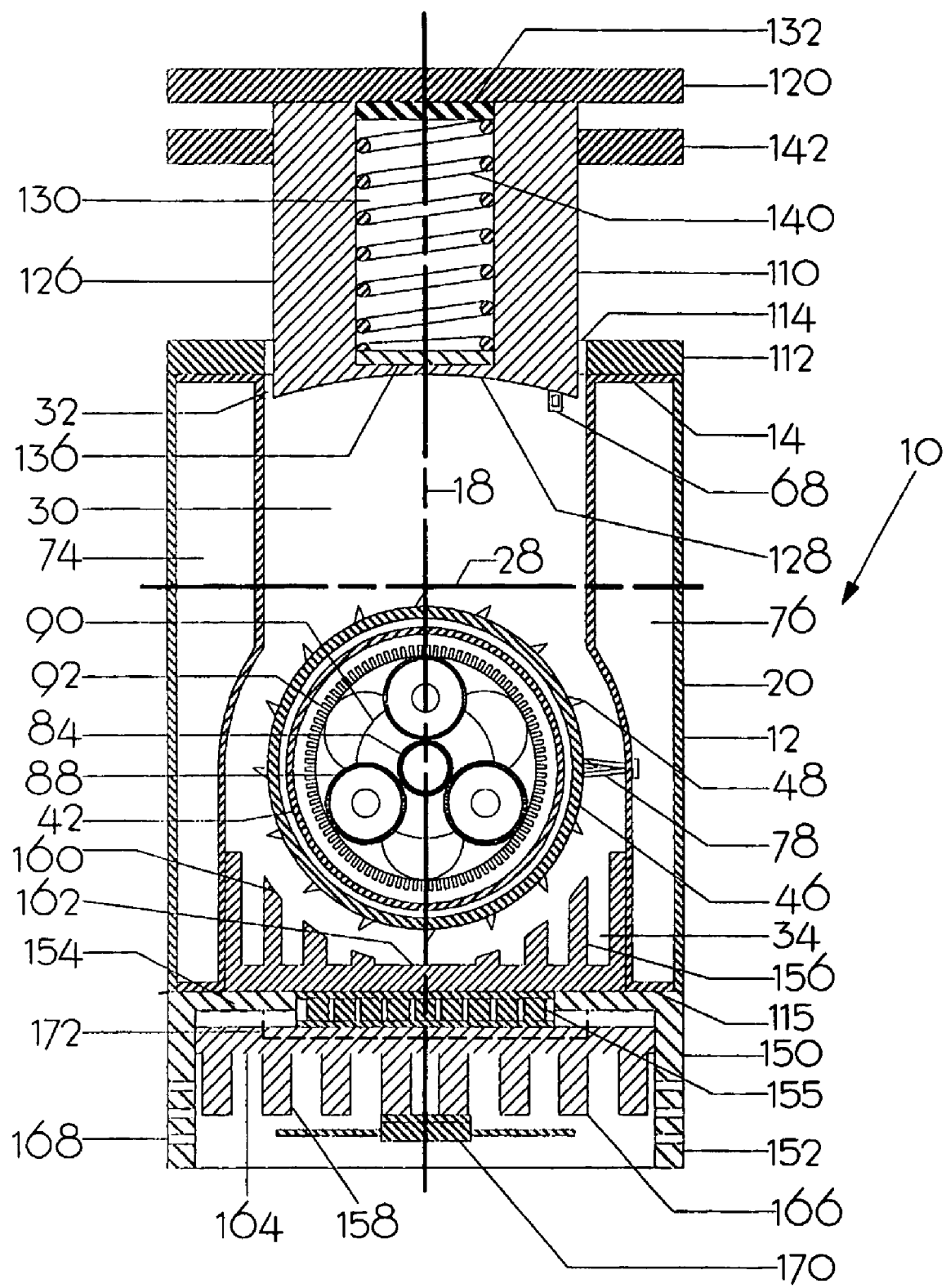
FIG. 3 is a schematic view illustrating another longitudinal cross-section of the embodiment of FIG. 1, which is perpendicular to the longitudinal cross-section of FIG. 2 and which is not proportional thereto.

Referring to the drawings, particularly FIGS. 1 to 3, a cheese processor, as an example of the present invention and generally indicated by numeral 10, preferably has a generally elliptical configuration in its cross-section. The cheese processor 10 includes a body 12 having a longitudinal axis 18 extending between a top end 14 and a bottom end 16 thereof. The body 12 is preferably elliptical in a cross-section perpendicular to the axis 18, and is divided into a center section 20 and two side sections 22, 24 as shown in the longitudinal cross-section of FIG. 2 in which the major axis 26 of ellipse extends. The longitudinal cross-section of FIG. 3 in which the shorter elliptic minor axis 28 of ellipse extends, only includes the center section 20 of the body 12.

The center section 20 defines a chamber 30 extending therethrough and having top and bottom openings 32, 34 on the respective top and bottom ends 14, 16 of the body 12. The chamber 30 further includes side openings 36, 38 at opposite side walls 35, 37, respectively of the center section 20. The side openings 36, 38 are positioned close to the bottom opening 34. The side opening 36 is slightly smaller than and aligned with the side opening 38 so that a motor/transmission assembly 40 contained by a cylindrical housing 42 is inserted through the opening 36 into the chamber 30 in a position perpendicular to the longitudinal axis 18. A flange 44 of the housing 42 is secured to the side wall 35 of the center section 20 to support the motor/transmission assembly 40 contained therein.

A hollow grinding cylinder 46 having a plurality of teeth 48 protruding from the exterior surface thereof, rotatably surrounds the cylindrical housing 42. The grinding cylinder 46 is connected to a torque output shaft 50 of the motor/transmission assembly 40 by means of keys 52 so that the grinding cylinder 46 can be driven to rotate by the motor/transmission assembly 40. The end of the torque output shaft 50 is secured to a retaining nut 54 which is rotatably supported in a bearing bushing 56 preferably secured in the side section 24.

The side sections 22, 24 are formed in a hollow configuration having compartments 58, 60, respectively, and are detachably secured for example by screws 62 to the respective side walls 35, 37 of the center section 20 to form the body 12 having a complete elliptical configuration as shown in FIG. 1. The side section 22 has an opening corresponding to the flange 44 of the housing 42 in order to permit a head portion of the housing 42 and the motor/transmission assembly 40 contained therein to extend into the compartment 58. The compartment 58 shown may optionally be filled with heat insulation material. The compartment 60 is used as a battery compartment for retaining rechargeable batteries 64 and can also optionally be filled with heat insulation materials.

The side section 22 further includes a switch 66 having an actuating end 68 which extends through openings in respective side section 22 and center section 20 from compartment 58 into the chamber 30, at a position close to the top opening 32. A bright white LED lamp 70 is provided at the bottom of the side section 22 to illuminate, for example, a dish placed below the cheese grinder 10 to be served with the ground cheese. Two battery charging contacts 72 are provided at the bottom of the side section 24. Proper wiring is provided in the compartments 58, 60 to connect the electric components to the batteries to form an operable circuit.

The center section 20 of the body 12 has front and rear walls 74, 76 which preferably have a hollow configuration. The exterior surfaces of the front and rear walls 74, 76 form part of the elliptical appearance of the body 12 and the space defined by the hollow configuration of the front, rear walls 74, 76 can be optionally filled with heat insulation material. A brush 78 is attached to the inner surface of the chamber 30 along the entire axial length of the grinding cylinder 46 in contact with the exterior surface of the grinding cylinder 46, in order to clean the cheese particles attached to the grinding cylinder 46.

Figure 4:
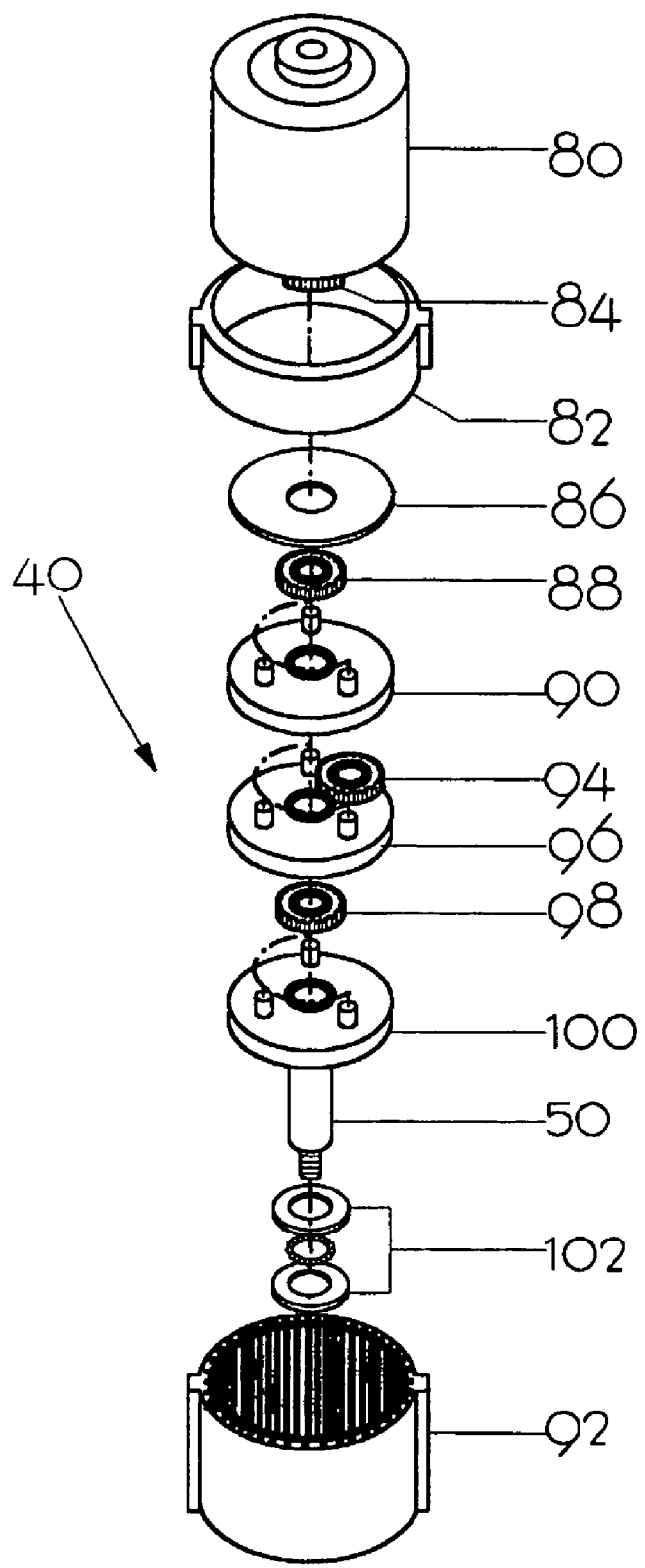
FIG. 4 is an exploded perspective view of a motor/transmission assembly used in the embodiment of FIG. 1.

Reference will now be made to FIGS. 2–4. The motor/transmission assembly 40 includes an electric motor 80 secured within the housing 42 by means of a retaining ring 82. A pinion gear 84 affixed to the motor shaft (not shown) extends though a washer 86, to engage three idle gears 88 (only one shown in FIG. 4). Each idle gear 88 is rotatably mounted on a plate 90 and engages an internal gear 92 which is in turn contained in and secured to the housing 42. When the pinion gear 84 is rotated, the idle gears 88 are driven to roll along the internal periphery of the internal gear 92 and thereby rotate the plate 90. The rotational speed of the plate 90 is reduced with respect to the motor speed. The reduction ratio is determined by the ratio of the number of teeth on the pinion gear 84 to the number of teeth on the internal gear 92. This is a typical planetary gear assembly which is well known in the art. Another pinion gear (not shown) is co-axially affixed to the bottom of the plate 90 and engages with three idle gears 94 (only one show in FIG. 4). The idle gears 94 are rotatably mounted to a plate 96 which is parallel to plate 90 and engage the internal gear 92. Similarly, a further pinion gear (not shown) affixed to the bottom of the plate 96 engages three idle gears 98 (only one shown in FIG. 4). The idle gears 98 are rotatably mounted to a plate 100 which is parallel to plate 96, and engage the internal gear 92. The torque output shaft 50 is co-axially attached to the bottom of plate 100. The torque output shaft 50 is rotatably mounted to the housing 42 by means of a bearing assembly 102 and extends through an end opening (not shown) of the housing 42.

The idle gears 94 driven by the pinion gear of plate 90 roll along the internal periphery of the internal gear 92 and thereby rotate plate 96 at a reduced rotational speed with respect to the rotational speed of plate 90. Similarly, the rotational speed of plate 100 will be further reduced with respect to the rotational speed of plate 96. Therefore the rotational speed of torque output shaft 50 is significantly reduced and the output torque is significantly increased with respect to the respective rotational speed and torque output of the motor 80, by means of the tri-level planetary gear assembly.

The body 12 (as illustrated in FIG. 2) preferably further includes a pair of posts 104 which are secured by, for example, screws 106 to the top end 14 of the respective side sections 22, 24 of the body 12. The posts 104 extend upright in a parallel relationship. Each of the posts 104 has a threaded top section 108 to engage a retaining nut 109.

The cheese processor 10 (as illustrated in FIGS. 2 and 3) further includes a cover 110 which is detachably mounted to the top end 14 of the body 12 to close the top opening 32 of the chamber 30, and function as a pressing mechanism to press a cheese block (not shown) loaded in the chamber 30 of the body 12 against the grinding cylinder 46 during a grinding operation.

The cover 110 includes a bottom plate 112 preferably having an elliptical contour to match the periphery of the body 12. The plate 112 has a center opening 114 shaped and sized in accordance with the top opening 32 of the chamber 30. A pair of tubes 116 are affixed to the bottom plate 112 at opposed sides thereof by retaining nuts 118. Each retaining nut 118 is received in a counter bore in the bottom of the bottom plate 112 and does not interfere with the abutment of the plate 112 to the top end 14 of the body 12. A top plate 120, preferably contoured the same as bottom plate 112 includes two openings 122 at opposed sides thereof for slidably receiving the tubes 116, and is prevented from being removed from the tubes 116 by two retaining nuts 124. Each of nuts 124 threadedly engages the top of the tube 116 and is preferably received in a counter bore in the top of the plate 120 so that the retaining nuts 124 are flush with the top surface of the top plate 120. The opening of each retaining nut 124 permits the threaded top section 108 to extend therethrough for engagement with the nut 109 when the posts 104 extend through the tubes 116, respectively.

A plunger 126 is positioned between the tubes 116 and preferably has a cross-section contoured to correspond to the cross-section of the chamber 30. In this embodiment, the plunger 126 preferably has a curved bottom surface 128 (see FIG. 3) and a cylindrical chamber 130 having a top opening which is detachably closed by a plate 132. The plunger 126 further includes two slots 134 longitudinally positioned in and extending laterally through the opposed side walls of the plunger 126. A spring resistance bar or plate 136 is placed in the cylindrical chamber 130, the opposed ends thereof extending through the respective slots 134 and out of the sides of plunger 126 in order to rest in two notches 138 formed in the top of the bottom plate 112 adjacent to the side edge of the opening 114 of the plate 112. A compression spring 140 is placed within the cylindrical chamber 130 of the plunger 126 between the plate 132 and the spring resistance bar or plate 136. Thus, the compression spring 140 is biased to urge the plunger 126 upwards to an original position, preferably abutting the bottom of the top plate 120. When the top plate 120 is moved downwards by an external force, the plunger 126 is pushed downwards and extends into the chamber 30 to press a cheese block against the grinding cylinder 46 for a grinding operation. However, the spring resistance bar or plate 136 is restrained by the bottom plate 112 and slides along the slots 134 when the plunger 126 is moved downwards into the chamber 30, thereby compressing the spring 140. When the external force exerted on the top plate 120 is discontinued, the compressed spring 140 will urge the plunger 126 with the top plate 120, to move back to their original position.

It is noted that if the spring resistance bar or plate 136 has a central section wider than the slots 134, as in this embodiment, the slots 134 should have a wider opening at the top to allow for placement and removal of the spring resistance plate 136. Alternatively, the slots 134 can be extended longitudinally through the top of the plunger 126 so that the spring resistance plate 136 can be removed together with the spring 140 from the open top end of the plunger 126 when the plate 132 is detached.

The switch 66 is located such that the actuating end 68 of the switch is positioned immediately below the curved bottom surface 128 of the plunger 126 when the plunger 126 is in its original position. Thus, the switch 66 will be actuated to begin a grinding operation immediately when the plunger 126 begins to move downwards to press the cheese block loaded within the chamber 30 against the grinding cylinder 46.

A third plate 142 is preferably provided below the top plate 120. The plate 142 has a contour similar to the bottom plate 112 and has openings 144 at opposed sides to permit the respective tubes 116 to slidably extend therethrough. A center opening 146 of the plate 142 shaped and sized similar to the center opening 114 of the bottom plate 112, permits the plunger 126 to extend through the plate 142. The plate 142 is spaced apart from the top plate 120 and secured thereto by two spacer rings 148 which slidably surround the respective tube members 116 so that plate 142 moves together with plate 120. The distance between the plate 120 and plate 142 is determined such that when the combination of the plunger 126 and plates 120, 142 is pressed downwards and stopped by the bottom plate 112 which is abutted by the plate 142, the curved bottom surface 128 of the plunger 126 is close to the grinding cylinder 46 but does not touch the teeth 48 thereof.

When the cover 110 is placed on the top of the body 12, the two posts 104 extend through the respective tubes 116. The threaded top sections 108 of the posts 104 extend through retaining nuts 124 and engage retaining nuts 109, respectively. Therefore, the cover 110 is secured together with the body 12. Nevertheless, other means for securing the cover 110 to the body 12 can be used. For example, the bottom plate 112 can be secured to the top end 14 of the body 12 by screws (not shown) or other fasteners.

A base 150 is preferably provided separately from the body 12 and the cover 110 and is adapted to be placed, for example, on a table to support the body 12 with the cover 110 resting thereon. The base 150 preferably has an elliptical cross-section similar to the body 12 but can be larger for both a pleasant appearance and better heat diffusion which will be further described below.

The base 150 generally includes an elliptical side wall 152 and a top wall 154 having a center aperture for receiving at least one thermal electric element, typically PELTIER diodes 155 which is secured between a metal cooling element 156 and a metal heat diffusion element 158. The cooling element 156 preferably includes a base plate 162 attached to the top ends of the PELTIER diodes 155 and rests on the top wall 154 of the base 150. A plurality of fins 160 extend upright from the base plate 162 into the bottom opening 34 of the chamber 30, without contacting the grinding cylinder 46 and the teeth 48 thereof when the body 12 is supported on the top wall 154 of the base 150. The base 150 not only supports the body 12 with the cover 110 attached thereto, but also completely closes the bottom opening 34 of the chamber 30.

The heat diffusion element 158, similar to the cooling element 156, has a base plate 164 contained within the compartment defined by the side walls 152 of the base 150, and is attached to the bottom ends of the PELTIER diodes 155. A plurality of fins 166 extend downwards from the base plate 164.

Each PELTIER diode 155 is formed by two pieces of dissimilar metals. Electric current flowing across the junction of the dissimilar metals causes heat to be absorbed or liberated. The direction of heat flow reverses if electrical current flow is reversed. The rate of heat flow is proportional to electrical current but depends upon both the temperature and materials at the junction. The PELTIER diodes 155 are arranged such that when they are connected in an electrical circuit, the top ends to which the cooling element 156 is attached absorb heat and the bottom ends to which the heat diffusion element 158 is attached liberate heat. Thus, heat within the chamber 30 of the body 12 is transferred through the assembly of cooling element 156, PELTIER diodes 155 and the heat diffusion element 158 into the compartment in the base 152. The fins 160 and 166 are used to increase the contact surface area of the respective cooling element 156 and the heat diffusion element 158 with surrounding air in order to facilitate heat exchanges. Openings 168 are preferably provided through the side wall 152 of the base 150 so that the compartment in the base 150 is in fluid communication with the atmosphere, thereby diffusing heat.

Optionally, a fan 170 is attached to the base 150 in order to facilitate heat diffusion from the compartment in the base 150. The fan 170 can be secured to the base 150 either within the compartment in the base 150 as shown in FIG. 3, or can form an additional fan assembly attached to the base 150, for example at the open bottom thereof.

A battery recharger 172, which is illustrated by broken lines, is attached to the base, and two charging contacts thereof (not shown) are positioned on the top wall 154 of the base 150 for contacting the charging contacts 72 of the body 12. The recharger 172 and the PELTIER diodes 155 are connected to a plug (not shown) adapted to connect an electric power source.

In order to load a cheese block into the cheese grinder 10, the two retaining nuts 109 are disengaged from the posts 104 to allow the cover 110 to be slidably moved along the posts 104 and detached from the top end 14 of the body 12. A cheese block is then placed into the chamber 30 through the top opening 32 thereof, resting on the grinding cylinder 46. The cover 110 is placed back on the top end 14 of the body 12 by receiving the posts 104 within the tubes 116 and sliding the cover 110 down along the posts 104 until the curved bottom surface 128 of the plunger 126 enters the chamber 30 and closes the top opening 32 thereof, and the bottom plate 112 abuts the top end 14 of the body 12. The two retaining nuts 109 are now rotated to engage the respective threaded top section 108 of the posts 104 in order to secure the cover 110 to the body 12. The cheese processor 10 is now ready for a grinding operation.

In the grinding operation, the body 12 is held above a dish to be served and the top plate 120 is manually pressed down. When the plunger 126 is pressed down against the spring 140 and thereby actuates the switch 68, the motor/transmission assembly 40 is energized by the batteries 64 to rotate the grinding cylinder 46. The cheese block loaded in the chamber 30 is pressed by the curved bottom surface 128 of the plunger 126 against the grinding cylinder 46 as it rotates. Thus, the bottom portion of the cheese block contacting the grinding cylinder 46 is ground by the rotating teeth 48 into particles which fall through the bottom opening 34 and onto the dish to be served.

When the grinding cylinder 46 begins rotation, the bright white LED lamp 70 is automatically lighted to illuminate the dish below the body 12 during the entire grinding operation, and is automatically turned off when the grinding cylinder 46 stops rotating.

When the grinding operation is completed, the pressing force on the top plate 120 is discontinued and the plunger 126 is urged by the compressed spring 140 to move upwards and push the plates 120, 142 back to their original positions as shown in FIGS. 2 and 3. When the curved bottom surface 128 of the plunger 126 is moved above the actuating end 68 of the switch 66, the motor/transmission assembly 40 is deactivated and the grinding cylinder 46 stops rotating The remaining portion of the cheese block is contained within the chamber 30, resting on the grinding cylinder 46 which is stationary.

After the completion of a cheese grinding operation, the body 12 with attached cover 110 is preferably placed back on the top of the base 150, such that the cooling element 156 is inserted into the bottom opening 34 of the chamber 30, the base 150 closes the bottom opening 34, and the battery charging contacts 72 are in contact with corresponding charging contacts positioned on the top wall 154 of the base 150 for recharging the batteries 64. The charger 172 and the PELTIER diodes 155 are normally maintained in connection with the electric power source so that the batteries 64 are being recharged and the chamber of the body 12 is being cooled continuously while the body 12 is supported on the base 150. Thus, a relatively low temperature is maintained within the chamber 30 of the body 12 in order to keep the remaining portion of the cheese block fresh for the next service.

The materials used for the cheese processor 10 of the present invention preferably are metal and/or plastic For example, in this embodiment the body 12 and the plates 112, 122, 142 and the tubes 116 are made from metal with polished exterior surfaces and the plunger 126, posts 104 and the top and bottom ends 14, 16 are made from plastics. Plastic lining can be optionally used in the chamber 30, as shown in FIG. 2 (not indicated). Nevertheless, the material used in the embodiment of the present invention does not constitute a part of the invention. Any suitable material can be used in this invention, for example, aluminium alloy may replace the metal configuration in order to reduce the weight of the cheese processor 10.

The cheese grinder 10 of the present invention can also be used as a cheese grater. The terms of grinder and grinding are not intended to limit the scope of the present invention from a cheese processor which can be either a cheese grinder or cheese grater.

Modifications and improvements to the above-described embodiment of the present invention may become apparent to those skilled in the art. The foregoing description is intended to be exemplary rather than limiting. The scope of the invention is therefore intended to be limited solely by the scope of the appended claims.

I claim:

1. An electric cheese processor comprising:
    a body having a longitudinal axis extending between a top end and a bottom end thereof, the body defining a chamber therein, the chamber having top and bottom openings in the respective top end and bottom end, the body housing an electric motor and a processing cylinder, the processing cylinder being positioned substantially perpendicular to the longitudinal axis within the chamber close to the bottom opening and being adapted for rotation when driven by the electric motor;
    a cover detachably mounted to the top end of the body to close the top opening of the chamber, the cover including a pressing mechanism extendable under an external force into the chamber of the body towards the processing cylinder so that a cheese block contained in an upper section of the chamber is pressed down against the processing cylinder, thereby being processed by the rotating processing cylinder into particles which fall from the bottom opening; and
    the processing cylinder being hollow and the electric motor being mounted within the hollow processing cylinder.

2. The electric cheese processor as claimed in claim 1 wherein the body comprises a battery compartment for containing at least one battery in order to energize the electric motor.

3. The electric cheese processor as claimed in claim 2 further comprising a base having a top end and a bottom end thereof, and including a cooling device therein, the body being detachably supported on the base and thereby the cooling device maintaining a relative low temperature in the chamber of the body.

4. The electric cheese processor as claimed in claim 3 wherein the base comprises a battery charger for recharging the battery contained in the battery compartment of the body while the body is supported on the base.

5. The electric cheese processor as claimed in claim 3 wherein the cooling device comprises a thermal-electric element.

6. The electric cheese processor as claimed in claim 2 wherein the body comprises a multi-level planetary gear assembly positioned within the hollow processing cylinder, operatively interconnecting the electric motor and the processing cylinder.

7. The electric cheese processor as claimed in claim 6 wherein the processing cylinder comprises a plurality of grinding teeth protruding radially from an external surface of the processing cylinder.

8. The electric cheese processor as claimed in claim 2 wherein the body comprises a center section and two side sections, the center section having the chamber therein and an opening at each side thereof, the openings being aligned with the processing cylinder in the chamber and being covered by the respective side sections, one of the side section including the battery compartment.

9. The electric cheese processor as claimed in claim 2 wherein the body comprises means for releasably securing the cover to the body.

10. The electric cheese processor as claimed in claim 9 wherein the pressing mechanism comprises a plunger moveable into the chamber of the body, the plunger having an cross section contoured to correspond with a cross section of the chamber.

11. The electric cheese processor as claimed in claim 10 wherein the pressing mechanism comprises a spring to urge the plunger away from the processing cylinder to an original position in which a bottom end of the plunger closes the top opening of the chamber.

12. The electric cheese processor as claimed in claim 11 wherein the cover comprises a top plate, a bottom plate and guiding members secured to the bottom plate, the top plate abutting a top of the plunger and slidably engaging the guiding members, the bottom plate having an opening permitting the plunger to extend therethrough when the top plate is pressed downwards.

13. The electric cheese processor as claimed in claim 11 wherein the body comprises a switch exposed into the chamber immediately below the plunger when the plunger is in the original position thereof, the switch being adapted to be actuated by the plunger when the plunger moves towards the processing cylinder in order to electrically interconnect the battery and the motor for a processing operation.

14. An electric cheese processor comprising:
a body having a longitudinal axis extending between a top end and a bottom end thereof, the body defining a chamber therein, the chamber having top and bottom openings in the respective top end and bottom end, the body housing an electric motor and a processing cylinder, the processing cylinder being positioned substantially perpendicular to the longitudinal axis within the chamber close to the bottom opening and being adapted for rotation when driven by the electric motor;
a cover detachably mounted to the top end of the body to close the top opening of the chamber, the cover including a pressing mechanism extendable under an external force into the chamber towards the grinding cylinder so that a cheese block contained in an upper section of the chamber is pressed down against the processing cylinder, thereby being ground by the rotating processing cylinder into particles which fall from the bottom opening; and
a base having a cooling device, the body being detachably supported on the base and thereby the cooling device maintaining a relative low temperature in the chamber of the body.

15. The electric cheese processor as claimed in claim 14 wherein the body comprises a battery compartment for containing at least one battery in order to energize the electric motor.

16. The electric cheese processor as claimed in claim 15 wherein the base comprises a battery charger for recharging the battery contained in the battery compartment of the body while the body is supported on the base.

17. The electric cheese processor as claimed in claim 16 wherein the cooling device comprises a PELTIER diode and cooling elements, the cooling elements being attached to a top end of the PELTIER diode and extending into the bottom opening of the chamber while the body is supported on the base.

18. The electric cheese processor as claimed in claim 17 wherein the base comprises a heat diffusion compartment having openings in fluid communication with atmosphere, and heat diffusion elements attached to a bottom end of the PELTIER diode and positioned in the heat diffusion compartment for diffusing heat liberated at the bottom end of the PELTIER diode.

19. The electric cheese processor as claimed in claim 18 wherein the base comprises a fan mounted therein to facilitate heat diffusion from the heat compartment.

* * * * *